Jan. 5, 1937.  J. W. DAWSON  2,066,929
WELDING APPARATUS
Filed Oct. 27, 1934  2 Sheets-Sheet 2
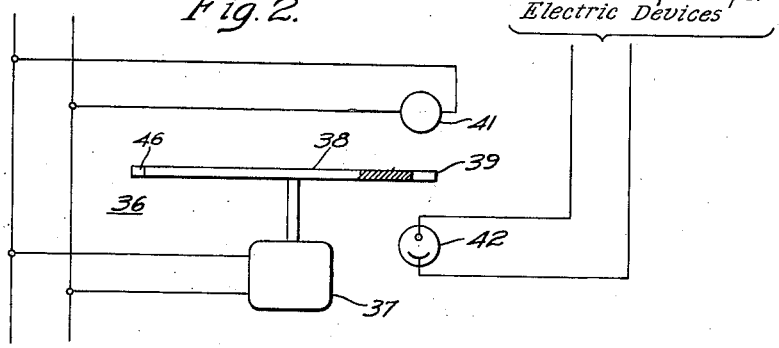
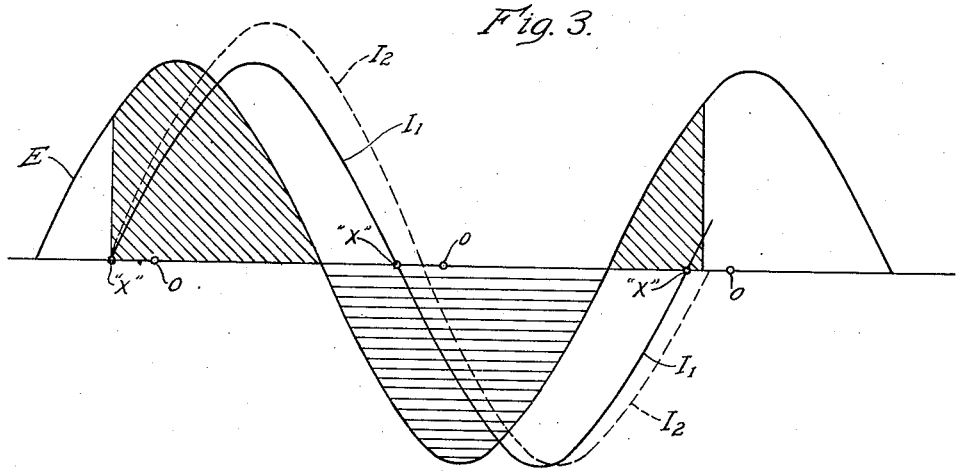
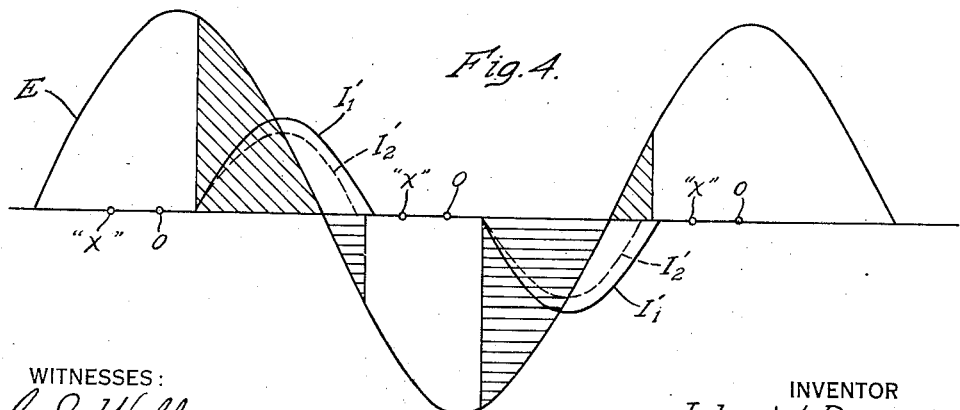
WITNESSES:
C. J. Weller
R R Lockwood
INVENTOR
John W. Dawson.
BY G. M. Crawford
ATTORNEY Patented Jan. 5, 1937

2,066,929

UNITED STATES PATENT OFFICE 2,066,929

WELDING APPARATUS

John W. Dawson, Wilkinsburg, Pa., assignor to Westinghouse Electric & Manufacturing Company, East Pittsburgh, Pa., a corporation of Pennsylvania Application October 27, 1934, Serial No. 750,299

7 Claims. (Cl. 219—4)

My invention relates generally to electric welding and it has particular relation to resistance welding.

When a welding shop is organized on a production basis, a number of welders may be employed for performing duplicate or nearly duplicate welding operations. For example, automobile bodies, refrigerator evaporators, containers in the form of metallic barrels or drums and the like are all manufactured on a production basis through the use of duplicate machines.

Since all of the welding machines for performing the welding operations may operate on the same duty cycle, it is feasible and desirable to use a common control system for all of the welders. The common control system is not only less expensive in installation cost than one individual to each machine, but also it permits the manufacture of a more uniform product since it is possible to more accurately control the entire range of welding operations.

In spot welding it is desirable to provide for connecting each individual spot welding machine to and disconnecting it from the common power circuit only when the power circuit is not energized. When such operation is employed, the circuit closing device associated with each spot welder need not be designed to interrupt the current as the current may be interrupted by the common control equipment.

When a plurality of spot welders or seam welders are connected to a common power circuit, the individual power factor of each machine must be taken into consideration, since it will affect, to a certain extent, the current flow to the other welding machines, the power factor of which may be somewhat different.

Accordingly, it is an object of my invention to provide a control system for a plurality of welders which shall be simple and efficient in operation and which may be readily and economically manufactured and installed.

The principal object of my invention is to provide for controlling the flow of current to a plurality of welding machines.

An important object of my invention is to provide for connecting a spot welder to a power circuit and to disconnect it therefrom only when no current is flowing in the power circuit.

Another object of my invention is to provide for connecting a plurality of welders to a power circuit at or after the zero point in the beginning of the half cycle of current which is adapted to be conducted through the welder having the largest power factor angle.

Other objects of my invention will, in part, be obvious and, in part, appear hereinafter.

My invention accordingly is disclosed in the embodiment hereof shown in the accompanying drawings and comprises the features of construction, combination of elements and arrangement of parts which will be exemplified in the construction hereinafter set forth and the scope of the application of which will be indicated in the appended claims.

For a more complete understanding of the nature and scope of my invention, reference may be had to the following detailed description taken in connection with the accompanying drawings, in which:

Fig. 2 illustrates diagrammatically the phototimer which is shown in Fig. 1, and Figs. 3 and 4 show a number of curves which demonstrate a novel mode of operation of parallel connected spot welders.

Figure 1:
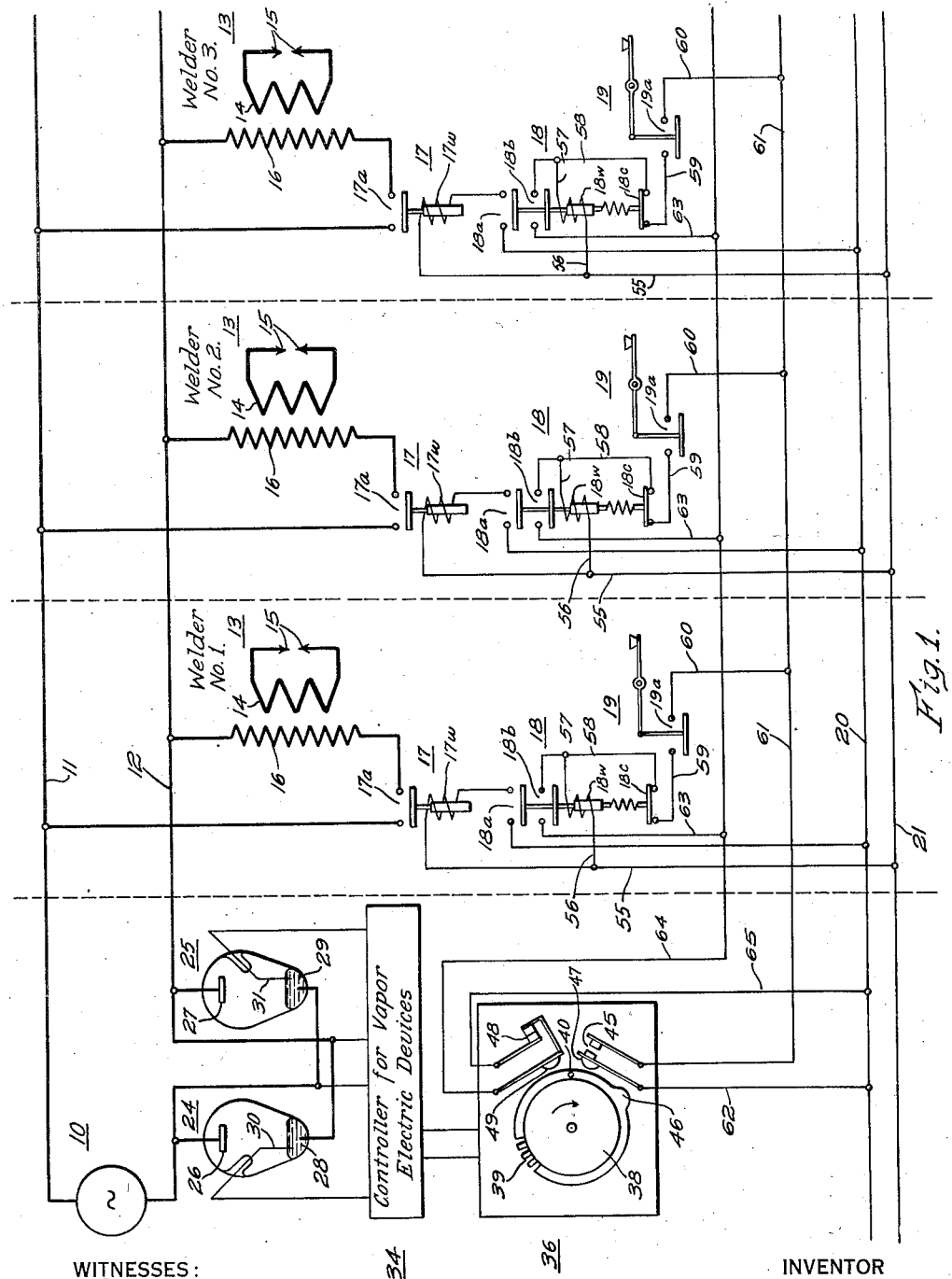
Figure 1 illustrates diagrammatically a concrete embodiment of my invention.

Referring now particularly to the drawings, the reference character 10 designates generally a source of alternating current which is provided to energize a welding or power circuit comprising conductors 11 and 12. A plurality of welding machines, each being shown generally at 13, as a spot welding machine, may be connected for energization to the power circuit. It will be observed that only three welding machines 13, designated as Nos. 1, 2 and 3, have been illustrated in the diagram, but it will be understood that as many machines may be connected to the power circuit as may appear to be desirable. Since the welders 13 and associated apparatus may, for practical purposes, be identical, the same set of reference characters will be applied to corresponding elements of each of the machines.

The welder 13 is provided with the customary welding transformer having a secondary winding 14 which may be connected to the welding electrodes 15 in the usual manner. The primary winding 16 may be connected for energization to the power circuit by means of a line switch, shown generally at 17, having an operating winding 17w and contact members 17a, which are bridged when the operating winding 17w is energized.

In order to more readily control the operation of the line switch 17, a control relay, shown generally at 18, is provided having an operating winding 18w and contact members 18a and 18b, which are bridged when the operating winding 18w is energized, and contact members 18c which are bridged when the operating winding 18w is deenergized.

The control relay 18 may be energized by the operator by means of a treadle switch, shown generally at 19, the contact members 19a of which are bridged when it is operated to connect the operating winding 18w of the control relay 18 across a control source which may be represented by the conductors 20 and 21.

As set forth hereinbefore, there are many instances where duplicate work is being performed by a plurality of spot welding machines. Each of the machines is operating on the same duty cycle with regard to the time of application of welding current. It is, therefore, feasible and desirable to provide a single control system which will be common to all of the welders and will, therefore, obviate the necessity of providing control equipment individual to each of them.

With this plan of operation in mind, I have provided a pair of vapor electric devices 24 and 25 which are inversely connected in series circuit relation between the power conductor 12 and the source of alternating current 10. The vapor electric devices 24 and 25 are arranged to conduct the entire flow of current which is supplied to one of the welders 13 or to as many as may be connected to the conductors 11 and 12 at any one time.

Each of the vapor electric devices 24 and 25 is provided, respectively, with an anode 26 and 27, a mercury pool cathode 28 and 29, and a starter electrode 30 and 31. When current is caused to flow through either of the starter electrodes 30 or 31, a cathode spot will be formed at its junction with the cathode 28 or 29 and the vapor electric devices 24 and 25 will be rendered conducting provided the polarity applied to the anodes and cathodes is that for which they are adapted to be conducting.

As illustrated in the drawings, the starter electrodes 30 and 31 may be connected to a controller, shown generally at 34, which is arranged to provide the necessary starting current. A photo-timer, shown generally at 36, is provided for controlling the time in any half cycle and the number of half cycles during which the vapor electric devices 24 and 25 may be conducting.

As illustrated more fully in Fig. 2, the phototimer 36 comprises a motor 37, which is preferably a synchronous motor, that is arranged to drive a disk 38. In the periphery of the disk 38, a limited number of teeth and slots are provided, as at 39 where four slots are illustrated, which are arranged to intercept at 40, Fig. 1, light rays from a light source 41 which fall on a photo cell 42. When the light rays impinge on the photo cell 42 through the slots, the controller 34 is arranged to cause starting current to flow through the appropriate starting electrode 30 or 31 in order to render either of the vapor electric devices 24 or 25 conducting, as the case may be.

For a more complete description of the details of construction and operation of the controller 34 and the photo timer 36, reference may be had to my copending application, Serial No. 728,363, filed May 31, 1934, and the copending application of Edwin H. Vedder, Serial No. 710,095 filed February 7, 1934, both of which applications are assigned to the assignee of this application.

With a view to preventing the energization of the operating winding 18w of the control relay 18, except at a predetermined time, normally open contact members 45 which may be arranged to be closed by means of a projection 46, which is carried, as illustrated, by the disk 38, are provided. As shown, the projection 46 is arranged to engage a projection 47 which is placed in its path in order to close the normally open contact members 45.

It is desirable to maintain the operating winding 18w of the control relay 18 energized as long as the power conductors 11 and 12 are energized in order to maintain the line switch 17 in the operated condition. When the control relay 18 is operated, an obvious circuit is completed through its contact members 18b and the normally closed contact members 48 to maintain the operating winding 18w energized until the contact members 48 are opened by the engagement of the projection 46 with a projection 49 as the disk 38 is rotated.

While each of the spot welding machines 13 may be of identical construction, it is possible that the constants thereof comprising resistance and inductance may be such that they will offer different impedance values to the flow of current. Stated differently, the power factor angle of each of the welding machines 13 may be greater or less than the power factor angle of the remaining machines. When machines having different power factor angles are connected in parallel circuit relation, the transient effect of current flow thereto must be taken into consideration. This is especially true if there is a wide variation in the power factor angles of the various machines.

Referring now particularly to Fig. 3 of the drawings, the curve to which the reference character E is applied represents the wave form of the voltage which is applied to the power conductors 11 and 12. The curve $I_1$ may be considered to represent the current which will flow to the No. 1 welder under normal steady state conditions. It will be observed that the curve $I_1$ intercepts its axis at point "x". The corresponding zero points for the current curve of welder No. 2 operating alone are indicated by "o".

Assuming that both welders Nos. 1 and 2 are connected to the conductors 11 and 12, and that current is caused to flow thereto at a time corresponding to the first zero point of the wave $I_1$, the current which will flow in welder No. 2 may be represented by the dotted line $I_2$. Due to the fact that current is caused to flow through the No. 2 welder at a time in advance of that at which it would flow during the steady state conditions, an unbalanced transient phenomena results, which may be indicated by the hatched areas under the voltage E. These areas represent the time during which voltage is applied to the primary windings 16 of the welders Nos. 1 and 2. It will be observed that the hatched area under the curve E above the axis is greater than the hatched area below the axis. This indicates that a finite average voltage is applied to the power circuit rather than a zero average voltage. This voltage will cause a direct current component to flow which may ultimately effect the saturation of the cores of the transformers connected to the circuit. This condition is highly undesirable.

In order to apply an average voltage of zero to the primary winding 16, I propose to control the time at which the vapor electric devices 24 and 25 are rendered conducting in accordance with the welder having the larger power factor angle, i. e. welder No. 2, in this instance. If the vapor electric devices 24 and 25 are arranged to be conducting, as illustrated in Fig. 4, at a time subsequent to the natural zero point at the beginning of the current wave of the welder having the larger power factor angle, an average voltage of zero will be applied and the direct current component in the alternating current will not appear. In Fig. 4, the curve $I_1'$, represents the current which flows through the primary winding 16 of welder No. 1 and the curve $I_2'$ represents the current flowing through the primary winding 16 of welder No. 2 under the assumed power factor conditions. In this figure, the zero points of the curves $I_1$ and $I_2$ are represented in the same manner as in Fig. 3. It will now be noted that the cross hatched areas above and below the axis under the voltage wave E are equal thereby indicating that an average voltage of zero is applied to the welders.

In operation, the photo-timer 36 is adjusted to cause the vapor electric devices 24 and 25 to become conducting at some point which is later than the zero point of the current wave of the welder having the largest power factor angle. However, no current will flow to any of the welders until the line switches 17 are closed.

In order to close the line switch 17, the operator depresses the treadle switch 19 thereby completing a circuit for energizing the operating winding 18w of the control relay 18 and, in turn, the operating winding 17w of the line switch 17.

The circuit for energizing the winding 18w may be traced from the energized conductor 21 through conductors 55 and 56, operating winding 18w, conductors 57 and 58, normally closed back contact members 18c, conductor 59, contact members 19a, conductors 60 and 61, normally open contact members 45 and conductor 62 to the energized conductor 20.

The foregoing circuit will be completed only when the normally open contact members 45 are closed, as is the case when the projection 46 on the disk 36 engages the projection 47 on the contact members 45.

The operation of the control relay 18 completes an obvious energizing circuit for the operating winding 17w of the line switch 17 and at contact members 17a the circuit is completed for connecting the primary winding 16 across the power conductors 11 and 12. The operation of the control relay 18 also completes a circuit for holding itself in, so that the operator need not hold the treadle switch 19 in the depressed position for a time longer than is necessary to effect the operation of the control relay 18.

The circuit for holding the operating winding 18w energized may be traced from the energized conductor 21 through conductors 55 and 56, operating winding 18w, conductors 57 and 58, contact members 18b, conductors 63 and 64, normally closed contact members 48 and conductor 65 to the energized conductor 20.

The contact members 18c are arranged to be held closed until the make contact members 18b are closed in order to insure that the operating winding 18w is maintained energized. The foregoing holding circuit will be completed as long as the normally closed contact members 48 remain in the closed position. Assuming, however, that the operator has released the treadle switch 19, the operating winding 18w will be deenergized as soon as the projection 46 engages the projection 49 on the normally closed contact members 48, thereby opening them to open the holding circuit.

The sequence of operation of any of the welders is identical with that hereinabove set forth. It will be observed that it is possible to operate the line switch 17 only during the interval when the vapor electric devices 24 and 25 are not supplying power to energize the power conductors 11 and 12. Therefore, the design of the line switches 17 may be relatively simple and inexpensive, since at no time are they called upon to close or open a circuit where arcing is liable to occur.

In view of the fact that the photo-timer 36 is so adjusted as to permit the vapor electric devices 24 and 25 to become conducting only at or after the zero point in the current wave of the welders having the largest power factor angle, no saturation of the cores of the transformer associated with the welders will occur and, therefore, there will be no direct current component present which, due to its cumulative effect, might eventually overload the vapor electric devices 24 and 25.

While the foregoing system has been described in particular relation to spot welding machines, it will be readily understood that the vapor electric devices 24 and 25 may be generally employed to supply pulsating power for different numbers and portions of half cycles of alternating current. Thus a plurality of seam welders may be connected to the power bus represented by the conductors 11 and 12 and the circuit interlocking scheme may be dispensed with. Since the load current to each seam welder would be broken only at the end of a relatively large number of successive welding operations the arcing which would be present if the circuit were opened at other than the zero period of the current wave will be of little moment.

Since certain further changes may be made in the foregoing construction and different embodiments of the invention may be made without departing from the scope thereof, it is intended that all matters contained in the above description or shown in the accompanying drawings shall be interpreted as illustrative and not in a limiting sense.

I claim as my invention:

1. A resistance welding system comprising, in combination, a source of alternating current, a plurality of welders disposed to be connected in parallel circuit relation, circuit means connecting the welders to the source of alternating current, circuit closing means interposed in the circuit means for controlling the flow of current to all of the welders simultaneously, control means disposed to operate said circuit closing means to complete the circuit to the welders for predetermined intervals, switch means individual to each welder for connecting it to said circuit means, and means for preventing the operation of said switch means while current is being supplied to perform the welding operation.

2. A resistance welding system comprising, in combination, a source of alternating current, a plurality of welders disposed to be connected in parallel circuit relation, circuit means connecting the welders to the source of alternating current, circuit closing means interposed in the circuit means for controlling the flow of current to all of the welders simultaneously, control means disposed to operate said circuit closing means to complete the circuit to the welders for predetermined intervals, normally open contact means disposed to be closed prior to the flow of current to the welders, normally closed contact means disposed to be opened after current ceases to flow to the welders, switch means individual to each welder for connecting it to said circuit means, and manually operable means disposed to effect the closure of said switch means through said normally open contact means, said switch means being held closed through said normally closed contact means until the opening thereof.

3. A resistance welding system comprising, in combination, a source of alternating current, a plurality of welders disposed to be connected in parallel circuit relation, circuit means connecting the welders to the source of alternating current, circuit closing means interposed in the circuit means for controlling the flow of current to all of the welders simultaneously, control means disposed to operate said circuit closing means to complete the circuit to the welders for predetermined intervals, normally open contact means disposed to be closed prior to the flow of current to the welders, normally closed contact means disposed to be opened after current ceases to flow to the welders, a line switch individual to each welder for connecting it to said circuit means, a control relay for effecting the operation of each line switch, and a manually operable switch for effecting the energization of each control relay through said normally open contact means, said control relay being held closed through said normally closed contact means until the opening thereof.

4. The method of connecting to an alternating current source a plurality of parallel connected welders having different circuit constants which comprises initiating the flow of current to the welders at such time that the average value of the voltage applied to the welders will be substantially zero during the welding period.

5. A resistance welding system comprising, in combination, a plurality of resistance welding devices, a power circuit for connecting said welding devices to a current source, means interposed in said power circuit for controlling the flow of current to all of said welding devices simultaneously to permit current to intermittently flow thereto, means individual to each welding device for connecting it to said power circuit, and means for preventing the operation of said last named means while current is being supplied to perform a welding operation.

6. A resistance welding system comprising, in combination, a plurality of resistance welding devices, a power circuit for connecting said welding devices to a current source, means interposed in said power circuit for controlling the flow of current to all of said welding devices simultaneously to permit current to flow thereto during predetermined intervals of time, switch means individual to each welding device for connecting it to said power circuit, and control means for effecting the operation of said switch means to connect a welding device to said power circuit only between said intervals of time.

7. A resistance welding system comprising, in combination, a plurality of resistance welding devices, a power circuit for connecting said welding devices to a current source, means interposed in said power circuit for controlling the flow of current to all of said welding devices simultaneously to permit current to flow thereto during predetermined intervals of time, switch means individual to each welding device for connecting it to said power circuit, control means for effecting the operation of said switch means to connect a welding device to said power circuit only between said intervals of time, and additional control means for effecting the operation of said switch means to disconnect a welding device from said power circuit only between said intervals of time.

JOHN W. DAWSON.